United States Patent

Geeroms

[11] Patent Number: 5,550,352
[45] Date of Patent: Aug. 27, 1996

[54] METHOD AND DEVICE FOR THE THERMAL CLEANING OF OBJECTS

[75] Inventor: André Geeroms, Erpe-Mere, Belgium

[73] Assignee: Dinamec, Naamloze Vennootschap, Belgium

[21] Appl. No.: 260,787

[22] Filed: Jun. 16, 1994

[30] Foreign Application Priority Data

Jun. 16, 1993 [BE] Belgium ............................... 09300611

[51] Int. Cl.6 ..................................................... H05B 1/02
[52] U.S. Cl. ........................... 219/497; 219/413; 219/482; 392/416; 588/901; 110/242
[58] Field of Search ........................... 219/411–413, 497, 219/505, 482; 110/243–246, 346; 392/416; 588/901

[56] References Cited

U.S. PATENT DOCUMENTS

| | | | |
|---|---|---|---|
| 3,727,564 | 4/1973 | Anderson | 110/8 R |
| 4,292,501 | 9/1981 | Maitenaz | 219/413 |
| 4,557,203 | 12/1985 | Mainord | 110/344 |
| 4,924,073 | 5/1990 | Chiba | 219/413 |
| 5,064,487 | 11/1991 | Fourne | 156/155 |
| 5,414,244 | 5/1995 | Imahashi | 219/497 |

FOREIGN PATENT DOCUMENTS

| | | |
|---|---|---|
| 0369351 | 5/1990 | European Pat. Off. . |
| 0384108 | 8/1990 | European Pat. Off. . |
| 2568987 | 2/1986 | France . |
| 3805435 | 8/1989 | Germany . |

*Primary Examiner*—Mark H. Paschall
*Attorney, Agent, or Firm*—Bacon & Thomas

[57] ABSTRACT

Method for the thermal cleaning of objects, in particular for removing materials such as plastics and such from metal objects (4), whereby the objects (4) to be cleaned are placed in a room (3) and are heated up to a temperature at which the materials to be removed pyrolyze, characterized in that the temperature of the objects (4) to be cleaned is controlled by means of a temperature sensor (6) which is situated in a measuring space (7), in particular a receiver (9) placed under the workpieces, which also serves to collect the melted plastics.

17 Claims, 1 Drawing Sheet

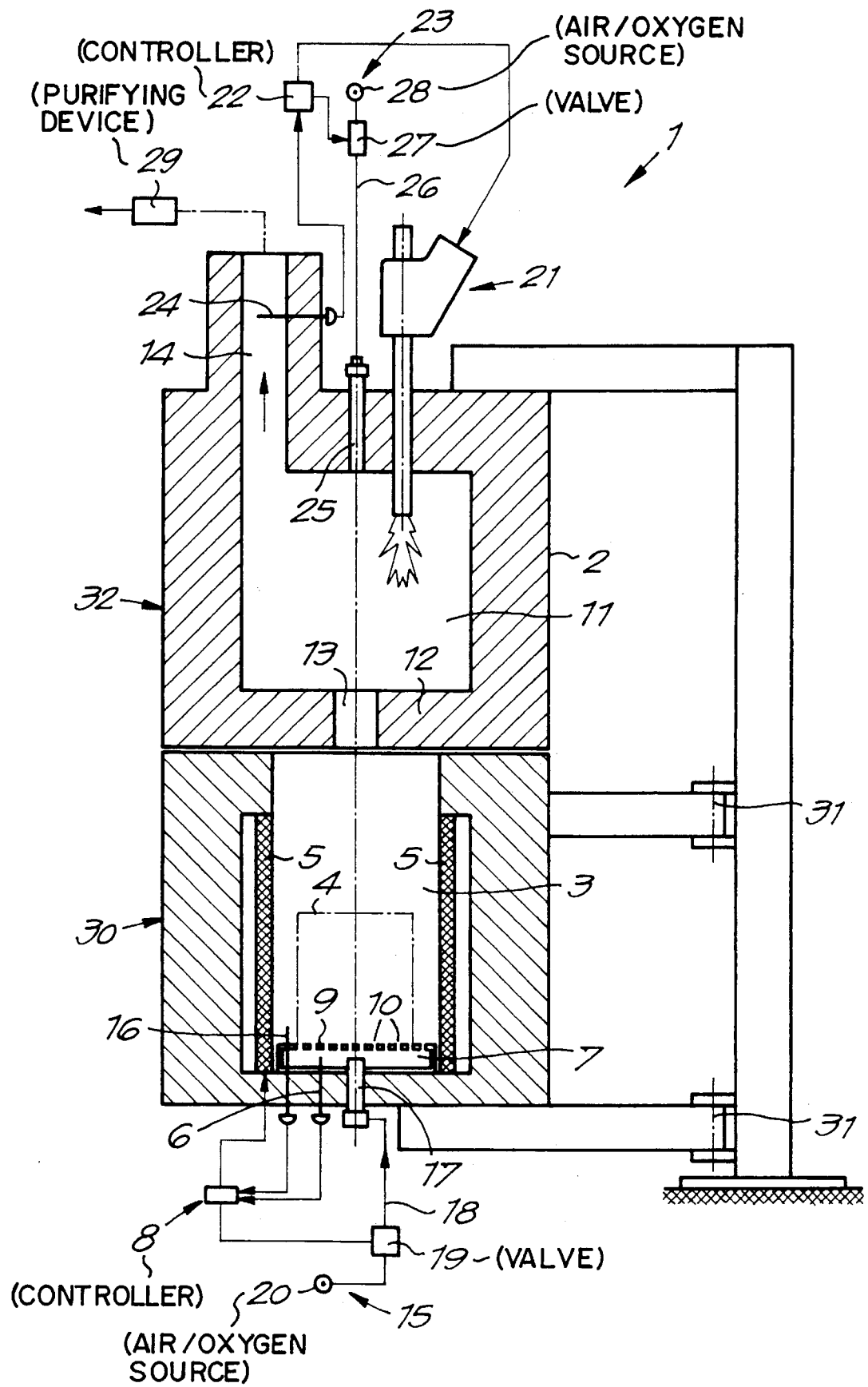

METHOD AND DEVICE FOR THE THERMAL CLEANING OF OBJECTS

BACKGROUND OF THE INVENTION

1. Field of the Invention

The present invention concerns a method and device for the thermal cleaning of objects, in particular for the removal of materials such as plastics from metal objects.

2. Discussion of the Prior Art

It is known that during the removal of plastics from metal objects by means of a thermal process, it is a problem to keep the temperature of the metal objects under strict control.

As the objects are often expensive, such as tools or machine parts, for example from the fibres industry, such as moulds in which plastics have congealed, a strict temperature control is very important, however, during a thermal cleaning, since the metal can lose its good mechanical properties when the temperature is too high, as a result of which the above-mentioned objects are damaged or lose much of their quality.

Moreover, in case of a non-homogenous temperature distribution over the metal object, damages may occur due to the ensuing tensions arising in the metal.

Cleaning furnaces are already known in which the temperature is controlled. However, the known embodiments show several disadvantages and defects.

In certain pyrolysis furnaces, the pyrolysis process is kept under control by injecting water in the furnace room when the temperature in the furnace gets too high.

A major disadvantage hereby is that the objects therein are subject to strongly varying temperatures and often start to corrode. With some objects there is also the disadvantage that, due to the periodical injection of water in certain places, the temperature in the objects to be treated is not homogenous, as a result of which damages may occur.

In other furnaces, called vacuum furnaces, a vacuum is created in the furnace during the first part of the cleaning cycle. During said first part of the cleaning cycle, the furnace room is slowly heated, such that at first, the main part of the plastics which are present on the object to be cleaned is melted off. This melted-off plastics are carried off to a receiver outside the heated furnace room, where the plastics congeal again.

Afterwards, the furnace temperature is further increased up to a value at which the plastic residues on the object to be cleaned can pyrolyse, for example at 400° C. to 450° C. The vacuum in the furnace is then maintained for a certain time, to make sure that the plastic residues which still remain on the object to be cleaned are pyrolysed or carbonized, without an uncontrolled ignition of the plastic residues being possible.

To further remove the residues which still remain afterwards, for example carbon residues, a second part of the cleaning cycle can be carried out, whereby air is admitted in the furnace room to further oxidize the organic residues.

The above-mentioned vacuum furnaces are disadvantageous, however, in that the total cleaning cycle necessarily takes long. The vacuum period must last long enough to make sure that the pyrolysis has come to an end before air is admitted in the furnace; otherwise, the sudden ignition of the plastics would overheat the object. Also, this first period lasts at least 60 minutes, and usually even longer. If one wishes to obtain an adequate cleaning result, a second period must be provided whereby air is admitted in the furnace. This period lasts at least 45 minutes and usually even longer.

A second disadvantage of such vacuum furnaces is that the melted-off plastics are collected separately. They usually cannot be re-used, and thus have to be removed as waste.

SUMMARY OF THE INVENTION

The present invention aims to offer a method and device for the thermal cleaning of objects whereby one or several of the above-mentioned disadvantages are excluded, in particular whereby a strict temperature control of the workpieces or objects is possible and whereby with a relatively short cleaning cycle, namely 45 to 90 minutes, a very good cleaning result can be obtained.

Other aims of the invention are to exclude an irregular heating; to entirely pyrolyse the plastics, such that no waste is created; to make it possible for the method to be realized in a device which has a simple construction and thus is relatively cheap; and to offer an environmentally friendly process.

In order to realize one or several of the above-mentioned aims, the invention concerns a method for the thermal cleaning of objects, in particular for removing materials such as plastics and such from metal objects, whereby the objects to be cleaned are placed in a room and are heated up to a temperature at which the materials to be removed pyrolyse, characterized in that the temperature of the objects to be cleaned is controlled by means of a temperature sensor which is situated in a measuring space, in particular a receiver placed under the workpieces, which also serves to collect the melted plastics. Indeed, tests have demonstrated that the temperature of a metal object to be cleaned is never higher than the temperature in the above-mentioned receiver. The use of a receiver in the space where the objects to be treated are situated also offers the advantage that also the plastics collected herein will finally disintegrate by means of pyrolysis, such that no waste is created.

According to a variant, a dummy workpiece is used as measuring space.

According to a special embodiment, a controlled combustion of the pyrolysis gases is provided for by means of an adjustable air and/or oxygen supply, whereby said supply is controlled by means of a measurement of temperature in the room where the objects to be treated are situated.

When the subsequent ignition is detected by means of the measurement of temperature, the air and/or oxygen supply is immediately reduced or cut off. By restricting the supply and immediately cutting it off when there is an ignition, the combustion very quickly comes to an end, such that the quantity of heat produced during the combustion is too small to make the temperature of the object to be treated rise. Test have demonstrated this.

According to the invention, apart from the spontaneous ignition resulting from the supply of air and/or oxygen, also an after-burning of the gases can be provided for.

This after-burning at a high temperature constitutes an ideal gas cleaning for most applications. Possibly, also a wet gas washing can be switched on afterwards.

The invention also concerns a device for realizing the above-mentioned method, consisting of a furnace with a room in which the objects to be treated can be placed and heating means for the above-mentioned room which make it possible to realize a pyrolysis in the room, characterized in that it is provided with a temperature sensor which is situated in a receiver placed under the objects to be treated which also serves to collect the melted plastics, and a control which makes sure that the heating means are controlled as a function of the value measured by the above-mentioned temperature sensor.

In order to better explain the characteristics of the invention, the following preferred embodiments are described as an example only without being limitative in any way, with reference to the accompanying drawing.

BRIEF DESCRIPTION OF THE DRAWING

The accompanying drawing shows a device 1 according to the invention.

DETAILED DESCRIPTION OF THE PREFERRED EMBODIMENT

The inventive device, generally indicated at 1, consists of a furnace 2 with a room 3 in which the objects 4 to be treated can be placed and heating means 5 for the above-mentioned room 3 which make it possible to realize a pyrolysis in the room 3.

The invention is special in that the device 1 is provided with a temperature sensor 6 which is situated in a measuring space 7 under the objects 4 to be heated and cleaned, and a control 8 which makes sure that the heating means 5 are controlled as a function of the value which is measured by the above-mentioned temperature sensor 6.

The control 8 is preferably designed such that a constant temperature can be achieved.

In the embodiment shown, the heating means 5 consist of electrical heating elements. Also, the control 8 provides for the adjustment of the energy supply to these heating elements.

According to the most preferred embodiment, as represented in the accompanying drawing, use is made for the measuring space 7 of a receiver 9 placed at the bottom in the room 3, more in particular the receiver 9 which is meant to collect the melted plastics. It is clear that this receiver 9 is open at its top side, or is provided with perforations 10 or such which form passages for the melted plastics.

The construction of the furnace 2 may have different forms. Preferably, but not necessarily, use is made of a furnace 2 with an after-burner chamber 11 which is separated from the above-mentioned room 3 by means of a wall 12 with an opening 13. It is clear that the furnace 2 is provided with an outlet 14.

In order to be able to realize the above-mentioned controlled combustion, the device 1, according to its preferred embodiment, is provided with air and/or oxygen supply means 15, a temperature sensor 16 to measure the temperature in the above-mentioned room 3 and control means, which can be part of the above-mentioned control 8, to adjust the air and/or oxygen supply as a function of the temperature in the furnace 2 and more in particular in the room 3.

Preferably, the control means are hereby designed such that air and/or oxygen is supplied at certain times, and that, as an ignition is detected at the temperature sensor 16, the air and/or oxygen supply is immediately cut off.

The air and/or oxygen supply means 15 may consist of an outlet 17 which opens into the furnace 2, preferably in the room 3, and which is connected to an air and/or oxygen source 20 under pressure via a pipe 18 with a valve 19 which is controlled by the control means.

According to a special embodiment, the device 1 may also be equipped with an after-burner, for which a burner 21 can be used. It can also be switched on and off by means of the control 22 and can have its own air and/or oxygen supply 23 with measurement of temperature 24. The supply 23 has an inlet 25 which is connected via a pipe 26 with a valve 27 to a source 28.

The exhaust gases may be possibly further purified by means of an element 29 connected onto the outlet 14 which provides for a wet or dry gas washing.

The furnace 2 preferably consists of two parts, for example a lower part 30 which is rotatable around a vertical shaft by means of hinges 31 and a fixed upper part 32, one and other such that as the lower part 30 is turned away, the top side of the room 3 becomes free, which makes it possible to place the objects 4 to be treated in it and to remove cleaned objects from it. The above-mentioned wall 12 then forms the bottom side of the upper part 32.

The working is mainly as follows. After the object 4 to be treated has been placed in the room 3, it is heated by means of the heating means 5. Part of the plastics hereby already flows into the receiver 9. The heating means 5 are controlled as a function of the value which is detected by the temperature sensor 6. Thus, overheating is avoided, and a very precise temperature setting is possible.

The temperature setting is such that the plastics which stick onto the object 4, as well as the plastics in the receiver 9, start to pyrolyse.

When sufficient pyrolysis gases have been formed, air and/or oxygen is supplied into the furnace 2 via the inlet 17, as a result of which there is a spontaneous ignition. This almost immediately causes a temperature rise of the air, which is detected by the temperature sensor 16. The control 8 then emits a signal as a result of which the air supply is immediately reduced or cut off, such that the combustion is quickly stopped and the quantity of heat produced during the combustion is too small to make the temperature of the object to be treated rise. Subsequently, the produced combustion gases may be subject to an after-burn by switching on the burner 21.

The above-mentioned cycle can be carried out repeatedly.

According to a major variant of the invention, instead of placing the temperature sensor 6 in the receiver 9, use is made of a temperature sensor which is placed in a dummy workpiece. Preferably, a dummy workpiece is used whose characteristics approach those of the object 4 to be cleaned.

It is clear that the heating means 5 can be of various nature. In the example shown in the drawing, use is made of externally placed electrical resistors. Naturally, also an internal heating can be provided. Moreover, other heating sources can be used, such as a hot medium, either a heated gas or a heated liquid.

The present invention is by no means limited to the embodiments described as an example and represented in the accompanying drawing; on the contrary, such a method and device for the thermal cleaning of objects can be made in all sorts of variants while still remaining within the scope of the invention.

I claim:

1. A method of thermally cleaning objects comprising:

placing an object to be cleaned upon a receiver defining a measuring space below the object within a room of a furnace;

heating the object to a temperature which causes materials to be cleaned from the object to disintegrate by means of pyrolysis;

providing a first temperature sensor within the measuring space of said room;

sensing the temperature associated with said object from said measuring space by means of said first temperature sensor;

controlling the temperature to which the object is heated based on the temperature sensed by said first temperature sensor;

sensing the temperature in said room by means of a second temperature sensor; and causing a controlled combustion in said room by supplying an adjustable flow of air/oxygen therein in dependence upon the sensed temperature in the room.

2. The method according to claim 1, further comprising:

collecting the material cleaned from the object in said measuring space.

3. The method according to claim 1, further comprising:

providing a dummy workpiece which defines said measuring space and which houses said temperature sensor.

4. The method according to claim 1, further comprising:

adjusting the supply of air/oxygen upon the detection of a state of ignition as determined by the sensed temperature in the room.

5. The method according to claim 1, further comprising:

communicating said room with an afterburner chamber.

6. A device for thermally cleaning objects comprising:

a furnace including a room into which objects to be cleaned are placed;

a receiver positioned under the objects to be cleaned, said receiver defining a measuring space of said room and functioning to collect the material cleaned from the object:

means for heating the objects to be cleaned to a temperature at which materials to be removed from the object disintegrate by means of pyrolysis;

a first temperature sensor provided within said measuring space of said room;

means for controlling said heating means based upon a measured temperature by said first temperature sensor;

means for delivering an air/oxygen supply to said room;

a second temperature sensor provided in said room; and means for adjusting the air/oxygen supply from said delivering means based on a temperature sensed by said second temperature sensor.

7. The device according to claim 6, wherein:

said adjusting means immediately reduces the air/oxygen supply upon ignition within said room as determined by the temperature sensed by said second temperature sensor.

8. The device according to claim 7, wherein said furnace further includes an afterburner including an afterburner chamber in communication with said room through an opening.

9. The device according to claim 8, wherein said afterburner chamber leads to an outlet of said furnace, said device further comprising a gas purifying device connected to said outlet.

10. The device according to claim 6, wherein said furnace further includes an afterburner including an afterburner chamber in communication with said room through an opening.

11. The device according to claim 10, wherein said afterburner chamber leads to an outlet of said furnace, said device further comprising a gas purifying device connected to said outlet.

12. The device according to claim 6, wherein said heating means comprises electrical heating elements.

13. The device according to claim 6, wherein said heating means comprises a heated fluid source.

14. The device according to claim 6, wherein said furnace comprises a lower part and an upper part, said lower part having said room formed therein with one end of said lower part opening into said room, said upper part including an internal afterburner chamber defined in party by one wall of said upper part that includes an opening extending therethrough, said upper part also being formed with an outlet, said upper and lower parts being movable relative to each other such that said furnace can assume a closed position in which the opening in the one wall of said upper part is aligned with the one end of said lower part that opens into said room and an open position wherein said lower part can receive an object to be cleaned.

15. The device according to claim 14, wherein said upper part is fixed and said lower part is rotatably mounted for movement relative to said upper part.

16. The device according to claim 14, further comprising an inlet into said afterburner chamber for the controlled supply of a combustible fluid therein.

17. The device according to claim 6, further comprising a dummy workpiece defining said measuring space.

\* \* \* \* \*